(12) United States Patent
Ban et al.

(10) Patent No.: US 6,845,296 B2
(45) Date of Patent: Jan. 18, 2005

(54) OBJECT TAKING OUT APPARATUS

(75) Inventors: Kazunori Ban, Yamanashi (JP); Ichiro Kanno, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 42 days.

(21) Appl. No.: 10/603,747

(22) Filed: Jun. 26, 2003

(65) Prior Publication Data

US 2004/0019405 A1 Jan. 29, 2004

(30) Foreign Application Priority Data

Jul. 24, 2002 (JP) ........................................ 2002-215083

(51) Int. Cl.$^7$ .............................................. G05B 19/00
(52) U.S. Cl. ........................ 700/245; 700/257; 700/258; 345/103; 382/151
(58) Field of Search ................................. 700/245, 257, 700/258; 209/546; 345/103, 93; 382/151, 284, 291; 702/82; 72/67, 406; 204/192.38, 298.41

(56) References Cited

U.S. PATENT DOCUMENTS

| | | | | |
|---|---|---|---|---|
| 4,435,835 A | * | 3/1984 | Sakow et al. ................ | 382/151 |
| 4,731,856 A | * | 3/1988 | Lloyd et al. ................. | 382/141 |
| 4,803,735 A | * | 2/1989 | Nishida et al. .............. | 382/151 |
| 4,876,597 A | * | 10/1989 | Roy et al. .................... | 348/143 |
| 4,876,728 A | | 10/1989 | Roth | |
| 5,845,048 A | * | 12/1998 | Masumoto ..................... | 706/20 |
| 6,019,504 A | * | 2/2000 | Adams ........................... | 374/5 |
| 6,493,465 B2 | * | 12/2002 | Mori et al. ................... | 382/209 |
| 2002/0039438 A1 | * | 4/2002 | Mori et al. ................... | 382/154 |

FOREIGN PATENT DOCUMENTS

| | | |
|---|---|---|
| EP | 1 043 689 A2 | 10/2000 |
| EP | 1 043 689 A3 | 10/2000 |
| JP | 8-271223 | 10/1996 |
| JP | 9-53915 | 2/1997 |
| JP | 9-91441 | 4/1997 |

OTHER PUBLICATIONS

Nakamura, Yuichi, et al., "Recognition of Overlapping 2–D Objects by Local Feature Construction Method", Proceedings of The International Conference on Pattern Recognition, IEEE Com. Soc. Press, vol. 2, conf. 9, Nov. 14, 1988.
Magee, Michael, et al., "An Industrial Model Based Computer Vision System", Journal of Manufacturing Systems, Society of Manufacturing Engineers, Dearborn, MI, vol. 14, No. 3, 1995, pp. 169–186.

* cited by examiner

Primary Examiner—Thomas G. Black
Assistant Examiner—Marc McDieunel
(74) Attorney, Agent, or Firm—Staas & Halsey LLP

(57) ABSTRACT

An object taking out apparatus capable of taking out randomly stacked objects with high reliability and low cost. An image of one of workpieces as objects of taking out at a reference position is captured by a video camera. Whole feature information and partial feature information are extracted from the captured image by a model creating section and a partial model creating section, respectively, and stored in a memory with information on partial feature detecting regions. An image of randomly stacked workpieces is captured and analyzed to determine positions/orientations of images of the respective workpieces using the whole feature information. Partial feature detecting regions are set to the images of the respective workpieces using the determined positions/orientations of the respective workpieces and information on partial feature detecting regions stored in the memory. Partial features of the respective workpieces are detected in the partial feature detecting regions using the partial feature information, and priority of taking out the workpiece is determined based on results of detection of the partial features. A robot is controlled to successively take out the object of the first priority using data of the position/orientation of the object of the first priority.

4 Claims, 4 Drawing Sheets

OBJECT TAKING OUT APPARATUS

BACKGROUND OF THE INVENTION

1. Field of the Invention

The present invention relates to an apparatus for successively taking out a plurality of objects stacked randomly using an industrial robot.

2. Description of Related Art

In taking out randomly staked objects such as workpieces one by one by a robot by detecting the objects using a visual sensor, there is a difficulty in how to treat objects overlapped with each other. This problem is generally solved by finding out an object located at the uppermost position in the stack of objects and taking out the uppermost workpiece.

In a method of detecting an interference of articles as disclosed in JP 9-91441A, it is determined whether or not there is any article other than a detected article in a circumferential region thereof using an image of articles captured by a TV camera, and overlapping of the detected workpiece and the other workpiece is determined based on an areas of the image of the other workpiece in the circumferential region and a height of the other workpiece determined by the other method. In this interference detection method, if the object of detection has a planner simple shape, for example, the detection of the other object will be vague to lower reliability of detection of the interference of the articles. Further, since the method other than the image processing is required for obtaining the height of the other article, this method is disadvantageous in manufacturing cost.

In an apparatus for recognizing position of an object as disclosed in JP 8-271223A, an object is detected by tracing an outline of an image of the object and if it is determined that there is overlapping of the object with other object, upper/lower positional relation of the detected object and the other object is determined based on a distribution of gradation of the overlapped portion of the image of the objects, or a height of the other object determined by emission of a reference light. In this apparatus, the determination of the overlapping of the objects depends on the tracing of the outline of the image of the objects, and it is highly probable that the outline of the image of the objects is not continuous because of reflecting condition of illuminating light on the objects, to lower reliability of the determination of the overlapped portion. Also, reliability of determination of the upper/lower position of the objects based on the distribution of gradation would be low for the same reason, and the emission of the reference light is disadvantageous in manufacturing cost of the apparatus.

Further, in an overlapping state recognizing method as disclosed in JP 9-53915A, an overlapped portion of detected objects is found out based on relative positions of the detected objects and upper/lower position of the objects is determined by judging what object the overlapped portion belongs to by local matching of features of the objects in the overlapped portion. In this method, the overlapped portion of the objects is determined by considering correlation of shapes of the objects geometrically. The processing for the determination would be simple in the case where each object has a simple shape such as a circle having a circumference at the same distance from a center of the shape, but if the objects have complicated shapes, processing for the determination will be complicated to increase calculation cost for carrying out the complicated processing.

SUMMARY OF THE INVENTION

An object of the present invention is to provide an apparatus for successively taking out a plurality of randomly stacked objects according to priority of taking out the object with high reliability and low cost.

According to the present invention, position/orientation of images of the respective objects are determined in an image of the plurality of objects, and visuality of partial features of the object is evaluated by the number of successes in detection of the partial features, the sum of matching indexes each representing a degree of matching of a partial image of the object and the corresponding partial feature, or the sum of products of the matching indexes and significance of the respective partial features with respect to a whole feature of the object, and the priority of taking out the object is determined based on the visuality of the partial features of the objects.

An object taking out apparatus of the present invention comprises: image capturing means for capturing an image of the plurality of objects; storing means for storing information on a whole feature representing a whole shape of the object, information on partial features representing one or more partial shapes of the object, and information on partial feature detecting regions defined for detection of the partial features of the object; object detecting means for determining positions/orientations of images of the respective objects in the image of the plurality of objects using the stored information on the whole feature of the object; partial feature detecting region setting means for setting partial feature detecting regions for the images of the respective objects based on the determined positions/orientations of the respective objects and the stored information on the partial feature detecting regions; partial feature detecting means for detecting the partial features of the objects in the set respective partial feature detecting regions; priority determining means for determining priority of taking out the object based on results of detection of the partial features of the objects; and a robot for successively taking out the objects according to the determined priority.

The priority determining means may evaluate the result of detection of the partial features of the object by the number of successes in detecting the partial features and determine the priority of taking out the object based on the number of successes.

The priority determining means may evaluate the result of detection of the partial features of the object using a matching index representing a degree of matching of a partial image of the object and the corresponding partial feature in the partial feature detecting region, and determine the priority of taking out the object based on the sum of the machining indexes.

Further, the priority determining means may evaluate the result of detection of the partial features using the matching index and significance of the partial feature detecting region with respect to the whole feature of the object, and determines the priority of taking out the object based on the sum of products of the matching indexes and the significance of the partial features.

DETAILED DESCRIPTION OF THE PREFERRED EMBODIMENTS

A system configuration of an object taking out apparatus and processing to be performed by the object taking out apparatus according to an embodiment of the present invention will be described referring to FIGS. 1–4b.

Figure 1:
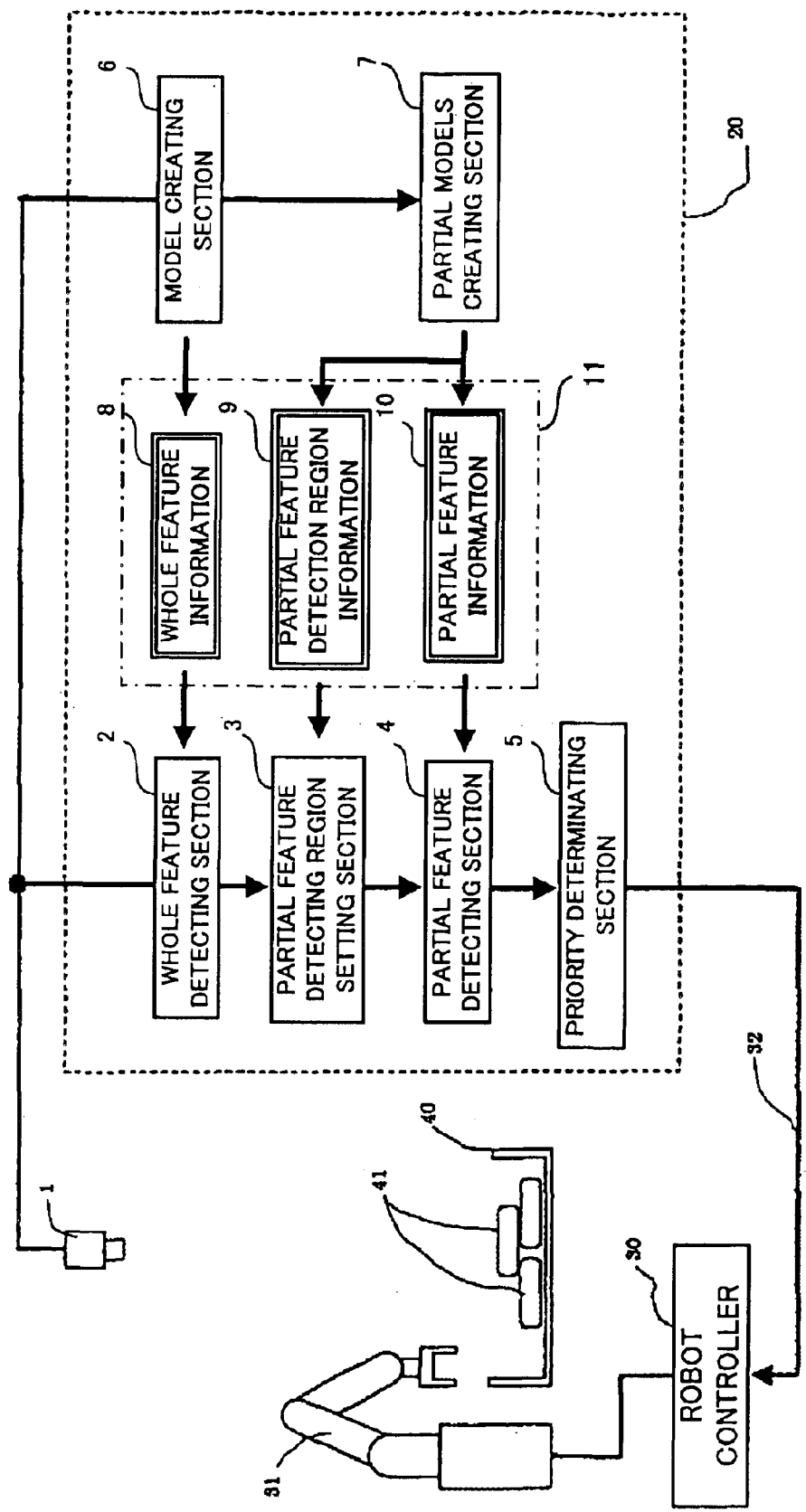
FIG. 1 is a schematic block diagram showing a system configuration of an object taking out apparatus including an image processing device for determining priority of taking out the object according to an embodiment of the present invention.

As shown in FIG. 1, a plurality of workpieces 41 is stacked randomly in a workpiece container 40. The workpiece taking out apparatus comprises a robot 31, a robot controller 30 for controlling the robot 31, and a two-dimensional sensor including a video camera 1 and an image processing device 20. The image processing device 20 indicated by the broken line in FIG. 1 is shown by a functional block diagram representing functions which are achieved by hardware such as a processor, memories, interfaces and a display device, and software such as an operation program and application programs for image processing.

The robot 31 is arranged at a position suitable for successively taking out the workpieces 41 placed on the workpiece container 40, and the video camera 1 is arranged at a position where a whole image of the workpieces 41 on the workpiece container 40 is captured within a field of view of the camera 1 from approximately exactly above the workpieces 41. The robot controller 30 and the image processing device 20 are connected with each other by a communication line 32, and the robot controller 30 controls the root 31 to successively perform handling, i.e. approaching, holding and taking out of the workpieces 41 according to "priority" of handling of the workpieces 41 determined by analyzing the image captured by the video camera 1 by the image processing device 20.

The "priority" of handling is a degree representing appropriateness or easiness of taking out the workpiece next. The taking-out operation of the workpieces 41 according to this embodiment is carried out by repeatedly performing the following steps (i) and (ii) until the taking out of all of the workpieces 41 is completed.

(i) determining priority of handling in the randomly stacked workpieces 41 by analyzing status of the respective workpieces 41 by the visual sensor, and (ii) controlling the robot 31 to perform handling (approaching, holding and taking out) of the workpiece of the first priority of handling using data of position/orientation of the workpiece of the first priority.

The handling priority of the last workpiece left on the workpiece container 40 is automatically determined to be the first.

For the determination of priority of handling in the above step (i), whole feature information to constitute a model of one of the workpieces as objects of taking out, and partial feature information to constitute partial models of the workpiece are prepared in advance.

An image of one of the workpieces 41 is captured by the video camera 1 arranged at a reference position. A model creating section 6 of the image processing device extracts whole feature information 8 of the workpiece 41 from the captured image of the workpiece 41. The whole feature information 8 is stored in an image memory 11 of the image processing device 20. The whole feature information 8 represents a feature of the whole shape of the workpiece 41 to constitute a model of the workpiece 41. A example of the whole feature information 8 is shown in FIG. 2a.

Further, partial feature information 10 of the workpiece 41 is extracted from the captured image of the workpiece 41 by a partial model creating section 7 and stored in the image memory 11 with partial feature detecting region information 9.

Figure 2B:
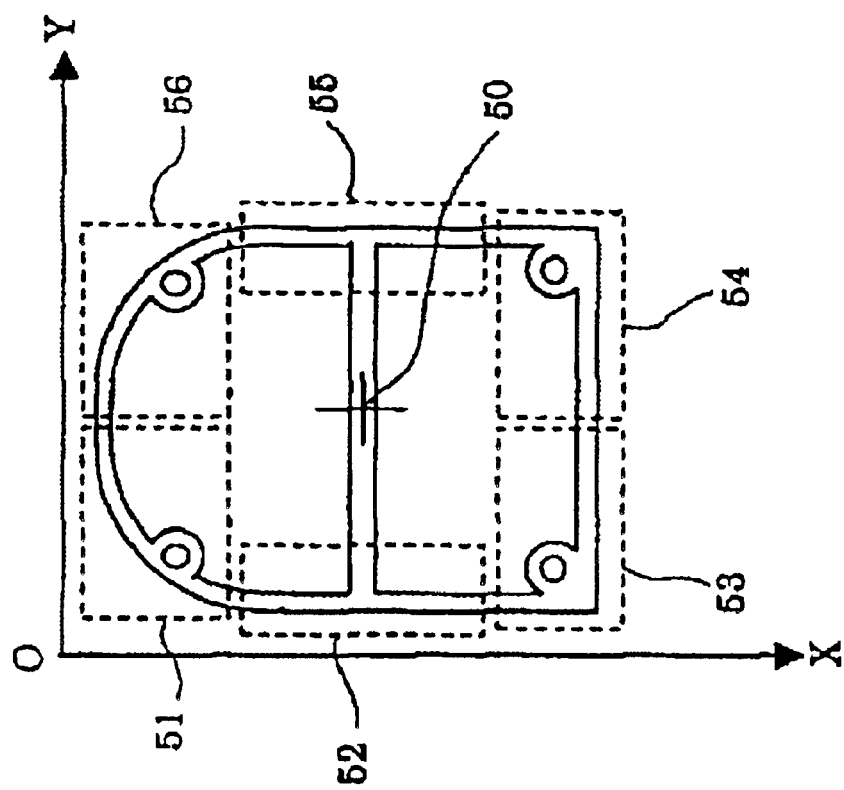
FIG. 2a is diagram showing an example of whole feature information of one workpiece as an object of taking out and FIG. 2b is a diagram showing an example of partial feature information of the workpiece.

The partial feature information 10 represents features of shapes of one or more parts of the workpiece 41 to constitute partial models of the workpiece. FIG. 2b shows an example of the partial feature information 10 to be associated with the whole feature information 8 which is extracted form the same image of the workpiece 41 as shown in FIG. 2a. In FIGS. 2a and 2b, an image coordinate system in a screen of the display device is indicated by O-XY.

Figure 2A:
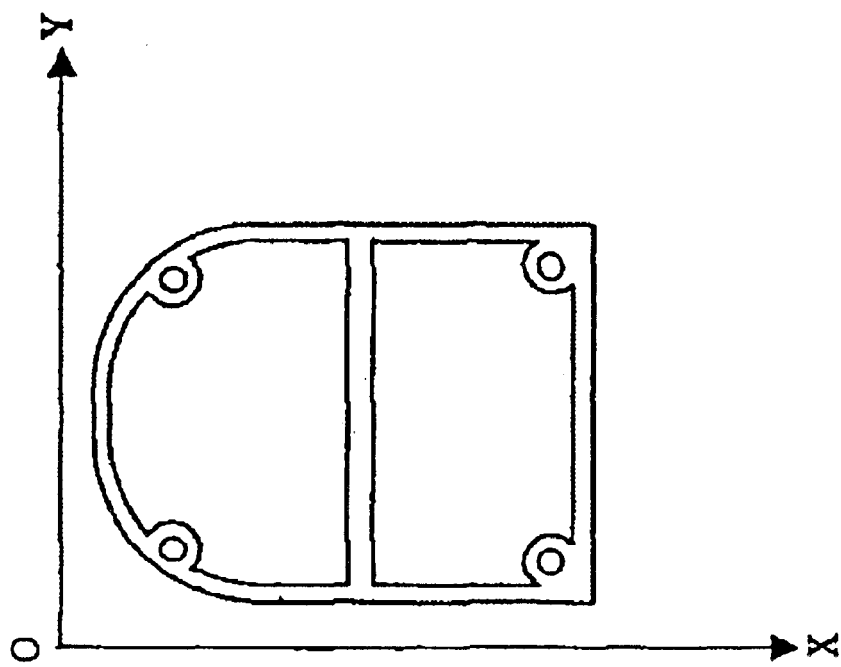

As can be see from comparison of FIG. 2a and FIG. 2b, the whole feature information 8 shown in FIG. 2a represents the whole shape of the workpiece 41 rather than any particular partial shape of the workpiece 41. In this example, the whole feature information 8 comprises principal contours of the whole image of the workpiece 41 as viewed from above the workpiece. The partial feature information 10 shown in FIG. 2b comprises contours of six parts selected in the principal contours of the whole image of the workpiece 41 constituting the whole feature information 8. The respective regions in which the six partial features exist constitute partial feature detecting regions 51-56, and information thereof is stored in the image memory 11 as partial feature detecting region information 9. In other words, the contours of the workpiece 41 in the respective partial feature detection regions 51–56 constitute the partial feature information 10 in this example. A relative position of the partial feature detecting regions 51–56 with respect to a reference point 50 of the whole feature information 8 is included in the partial feature detecting region information 9.

The processing for determination of the priority of handling of the workpiece for successively handling the workpieces will be described. An image of the plurality of workpieces 41 captured by the video camera 1 is sent to a whole feature detecting section 2 of the image processing device 20. The whole feature detecting section 2 analyzes the captured image of the workpieces 41 to successively recognize whole images of the respective workpieces 41 using the whole feature information 8 of the workpiece 41 and determine positions/orientations of the respective workpieces 41. The recognition of images of the workpieces in the captured image can be carried out by various known technologies. A partial feature detecting region setting section 3 sets partial feature detecting regions in which the partial features are to be detected based on the information on positions/orientations of the respective workpieces 41 determined by the whole feature detecting section 2 and the partial feature detecting region information 9 stored in the image memory 11.

Figure 3:
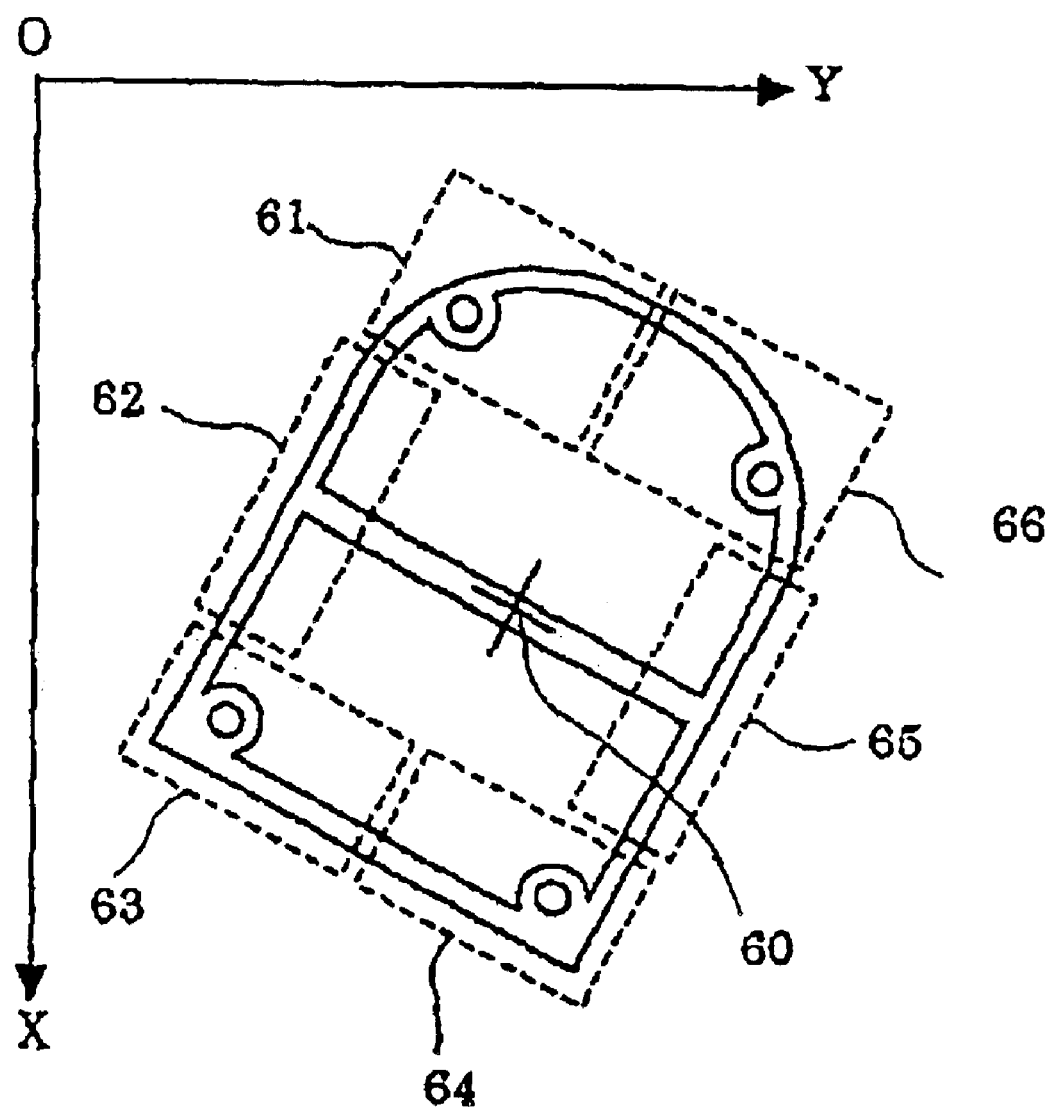
FIG. 3 is a diagram showing an example of partial feature detection regions in the whole image of the workpiece.

An example of partial feature detection regions in the whole image of the workpiece 41 is shown in FIG. 3. As shown in FIG. 3, a whole image of the workpiece 41 is recognized in the captured image of the workpieces 41 using the whole feature information 8, and the position/orientation of the workpiece 41 are determined by the whole feature detecting section 2. In this example, the whole image of the workpiece 41 is inclined in the image coordinate system O-XY, and position of the reference point of the whole image of the workpiece 41 is determined as indicated by a reference numeral 60. Partial feature detection regions 61–66 are set by the partial feature detecting region setting section 3 based on the partial feature detecting region information 9 using the determined reference point 60 and the orientation of the whole image of the workpiece 41. Then, the detection of the partial features in the respective partial feature detection regions 61–66 is performed by the partial feature detecting section 4 using the partial feature information 10.

A result of detection of the respective partial features is expressed by a positive integer representing the sum of successes in detection of partial features, for example, and the positive integer is calculated for each workpiece. Data of the detection result of the partial features as evaluated are sent to a handling priority determining section 5, and handling priorities are assigned to the workpieces 41 in the order of the positive integer representing the number of successes in detection of the partial features. Thus, the first priority is assigned to the workpiece having the greatest positive integer and the stored information on position/orientation of the workpiece of the first priority is sent to the robot controller 30. If there are a plurality of workpieces having the same and greatest positive integer, the first priority is assigned to the workpiece detected earlier, for example.

Figure 4B:
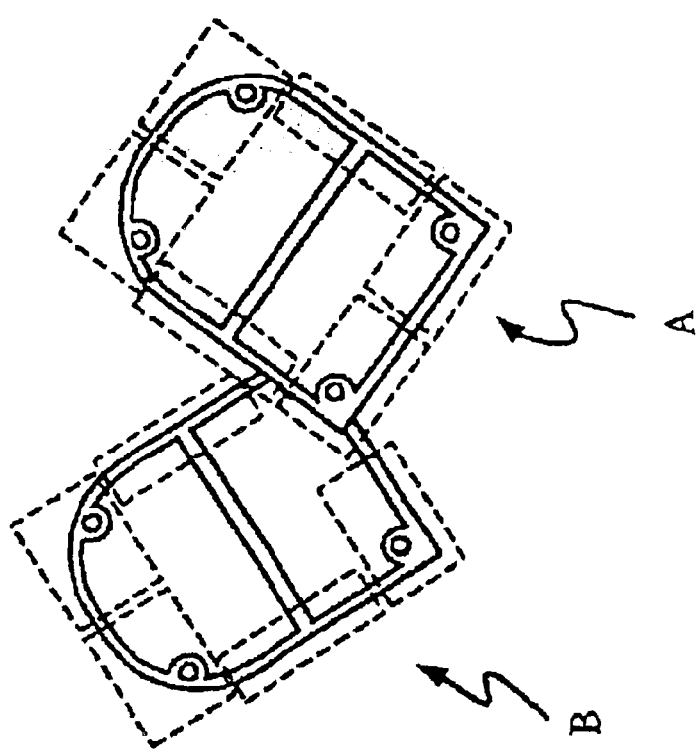
FIG. 4b is a diagram showing partial feature detecting regions respectively set to the images of the two workpieces for determining priority of taking out the workpiece.
Figure 4A:
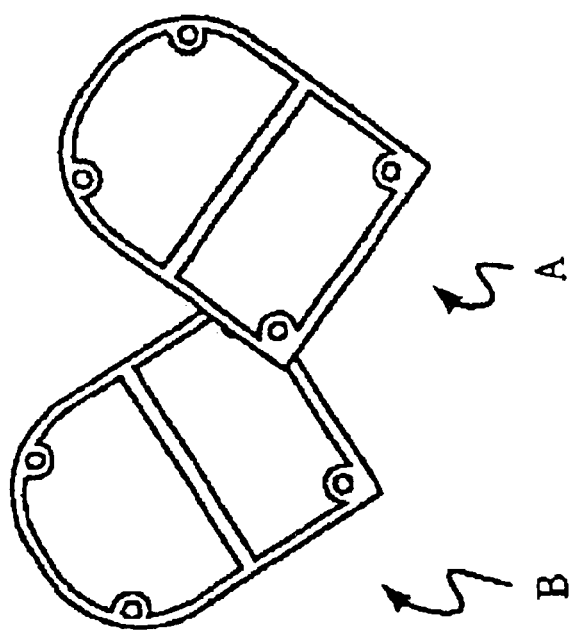
FIG. 4a is a diagram showing images of two workpieces overlapping with each other.

An example of the determination of handling priorities will be described on a case where whole images of two workpieces A and B are positioned as shown in FIG. 4a. The partial features detecting regions as indicated by the broken lines in FIG. 4b are set to the respective whole images of the two workpieces and the detection of the partial features in the respective partial features detecting regions is performed, as described. The number of successes in detection of the partial features in the lefthand workpiece B is smaller than that in the right hand workpiece A. Thus, the first priority is assigned to the workpiece A as an object to be picking up first.

As the measure or criterion for determining priorities of picking up, a matching index representing a degree of matching of the partial image of the workpiece and the corresponding partial feature information may be used, and the priorities may be determined based on the sum of the matching indexes, as well as the number of success in detection of the partial features as described. The matching index may be expressed by a positive integer ranging from the minimum value of "0" to the maximum value of "100", for example, and is determined for each detection of the partial feature in the partial feature detecting region of the workpiece.

For example, with respect to the workpiece A as shown in FIGS. 4a and 4b, since the whole shape of the workpiece A is exposed to be visible, the maximum value of "100" of the matching index is given for each detection of the partial feature to make the sum of "600" of the matching indexes. With respect to the workpiece B, since a part of the workpiece B is covered by the workpiece A, a lower value, e.g. "30" of the matching index is given to the detection of the partial feature in the covered portion of the workpiece, to make the sum lower than the sum "600" of the matching indexes of the workpiece A. With this arrangement, it is determined that the priority of the workpiece A>the priority of the workpiece B more minutely.

Further, so as to take account of significance of the respective partial features, it is effective to use data of areas of the partial feature detecting regions, and the priorities may be determined based on the sum of products of the respective matching indexes and the areas of the corresponding partial feature detecting regions. Specifically, the matching index in each detection of the partial feature is multiplied by a coefficient representing significance of the partial feature detecting region with respect to the whole feature, and the priority of each detected workpiece is determined based on the sum of the products.

The above embodiment is directed to a case where the robot handles two-dimensional planner workpieces using the single video camera. However, the present invention is not restricted to such case, and is applicable to a case where a plurality of three-dimensional solid workpieces are to be handled by the robot using a stereo vision system with a plurality of video cameras. In this case, the present invention is applied to an image of workpieces captured by any of the video cameras, so that the priority for successively picking up the plurality of workpieces is determined.

According to the present invention, the priority of picking up of the object is determined based on visuality of partial features of the objects, to solve the problems in the prior art as follows;

(1) The determination of the priority is not concerned with reliability of determination of the other object which has been a problem in determination of overlapping of the objects in the prior art.

(2) The determination of the priority does not concern continuousness of an outline of an image of objects which has been a problem in determination of overlapping of the objects in the prior art.

(3) The evaluation of distribution of gradation of the image of the objects for determinating upper/lower relation of the objects in the overlapped portion, which is of low reliability, is not necessary and also the emission of a reference light is not necessary.

(4) It is not necessary to carry out complicated processing for the complicated shapes of the objects in order to determine the overlapped portion with other object, which has been required in the prior art.

Thus, the present invention provides an object taking out apparatus advantageous in reliability of operation and also in cost for processing for operation.

What is claimed is:

1. An object taking out apparatus for taking out a plurality of objects one by one, comprising:

image capturing means for capturing an image of the plurality of objects;

storing means for storing information on a whole feature representing a whole shape of the object, information on partial features representing one or more partial shapes of the object, and information on partial feature detecting regions defined for detection of the partial features of the object;

object detecting means for determining positions/orientations of images of the respective objects in the image of the plurality of objects captured by said image capturing means using the information on the whole feature of the object stored in said storing means;

partial feature detecting region setting means for setting partial feature detecting regions for the images of the respective objects based on the positions/orientations of the respective objects determined by said object detecting means and the information on the partial feature detecting regions stored in said storing means;

partial feature detecting means for detecting the partial features of the objects in the said respective partial feature detecting regions using the information of the partial features stored in the storing means;

priority determining means for determining priority of taking out the object based on evaluation of detection of the partial features of the objects by said partial feature detecting means; and a robot for successively taking out the objects according to the priority determined by said priority determining means.

2. An object taking out apparatus according to claim 1, wherein said priority determining means evaluates the result of detection of the partial features of the object by the number of successes in detecting the partial features and determines the priority of taking out the object based on the number of successes.

3. An object taking out apparatus according to claim 1, wherein said priority determining means evaluates the result of detection of the partial features of the object using a matching index representing a degree of matching of a partial image of the object and the corresponding partial feature in the partial feature detecting region, and determines the priority of taking out the object based on the sum of the machining indexes.

4. An object taking out apparatus according to claim 1, wherein said priority determining means evaluates the result of detection of the partial features using a matching index representing a degree of matching of a partial image of the object and the corresponding partial feature in the partial feature detecting region, and significance of the partial feature detecting region with respect to the whole feature of the object, and determines the priority of taking out the object based on the sum of products of the matching indexes and the significance of the partial features.

* * * * *

UNITED STATES PATENT AND TRADEMARK OFFICE
CERTIFICATE OF CORRECTION

PATENT NO. : 6,845,296 B2
DATED : January 18, 2005
INVENTOR(S) : Kazunori Ban et al.

It is certified that error appears in the above-identified patent and that said Letters Patent is hereby corrected as shown below:

Column 2,
Line 49, change "machining" to -- matching --.

Column 3,
Line 35, change "root" to -- robot --.

Column 4,
Line 16, change "form" to -- from --.
Line 19, change "see" to -- seen --.

Column 5,
Line 34, change "lefthand" to -- left hand --.
Line 37, change "picking" to -- picked --.
Line 44, change "success" to -- successes --.

Column 6,
Line 32, change "determinating" to -- determining --.

Column 8,
Line 5, change "machining" to -- matching --.

Signed and Sealed this

Thirtieth Day of August, 2005

JON W. DUDAS
*Director of the United States Patent and Trademark Office*